(12) United States Patent
Kwon et al.

(10) Patent No.: US 12,462,719 B2
(45) Date of Patent: Nov. 4, 2025

(54) DISPLAY DEVICE

(71) Applicant: Samsung Display Co., LTD., Yongin-si (KR)

(72) Inventors: Oh June Kwon, Yongin-si (KR); Woo Yong Sung, Yongin-si (KR); Seung Yong Song, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/636,341

(22) Filed: Apr. 16, 2024

(65) Prior Publication Data

US 2025/0078708 A1 Mar. 6, 2025

(30) Foreign Application Priority Data

Aug. 28, 2023 (KR) .................. 10-2023-0112619

(51) Int. Cl.
*G09G 3/00* (2006.01)
*G06F 3/041* (2006.01)
*G09G 3/3208* (2016.01)

(52) U.S. Cl.
CPC .......... *G09G 3/035* (2020.08); *G06F 3/0412* (2013.01); *G09G 3/3208* (2013.01)

(58) Field of Classification Search
CPC ..... G09G 3/035; G09G 3/3208; G06F 3/0412
See application file for complete search history.

(56) References Cited

U.S. PATENT DOCUMENTS

| | | | |
|---|---|---|---|
| 9,627,637 B2 | 4/2017 | Kwon | |
| 2016/0155967 A1* | 6/2016 | Lee | H10K 50/86 |
| | | | 257/88 |
| 2017/0147117 A1* | 5/2017 | Song | H10K 77/111 |
| 2018/0107250 A1* | 4/2018 | Cho | G06F 1/1652 |
| 2019/0107866 A1* | 4/2019 | Han | G06F 1/1637 |
| 2020/0401275 A1* | 12/2020 | Shin | G06F 3/0445 |
| 2021/0141419 A1* | 5/2021 | Wang | G06F 1/203 |
| 2021/0318726 A1* | 10/2021 | Cho | H04M 1/0249 |
| 2021/0405781 A1* | 12/2021 | Li | G06F 1/1637 |
| 2022/0221952 A1* | 7/2022 | Kishimoto | G06F 3/0412 |
| 2022/0238821 A1* | 7/2022 | Cho | G06F 1/1637 |
| 2023/0080831 A1* | 3/2023 | Liao | H10K 50/844 |
| | | | 257/91 |
| 2023/0288959 A1* | 9/2023 | Park | G06F 1/1641 |

FOREIGN PATENT DOCUMENTS

| | | |
|---|---|---|
| CN | 115241391 A | 10/2022 |
| KR | 101015851 B1 | 2/2011 |
| KR | 1020220039939 A | 3/2022 |

* cited by examiner

*Primary Examiner* — Ryan A Lubit
(74) *Attorney, Agent, or Firm* — CANTOR COLBURN LLP

(57) ABSTRACT

A display device includes a display panel including a folding area, and a display driving circuit which drives image display pixels of the display panel, where the display panel includes a display layer, in which the image display pixels are disposed, an elasticity control layer disposed on the display layer and having an area corresponding to the area of the folding area, and a touch sensing unit disposed on the elasticity control layer to detect a user's touch.

16 Claims, 11 Drawing Sheets

ELP: OLI, ML1, ML2

DISPLAY DEVICE

This application claims priority to Korean Patent Application No. 10-2023-0112619, filed on Aug. 28, 2023, and all the benefits accruing therefrom under 35 U.S.C. 119, the content of which in its entirety is herein incorporated by reference.

BACKGROUND

1. Field

The disclosure relates to a display device.

2. Description of the Related Art

As the information society develops, demands for display devices for displaying images are increasing in various forms. For example, display devices are applied to various electronic devices such as smartphones, digital cameras, notebook computers, navigation devices, and smart televisions.

The display devices may be flat panel display devices such as liquid crystal display devices, field emission display devices, and organic light emitting display devices. Among these flat panel display devices, an organic light emitting display device includes a light emitting element that enables each pixel of a display panel to emit light by itself. Thus, the organic light emitting display device can display an image without using a backlight unit that provides light to the display panel.

Recently, various types of display devices that can selectively adjust an image display area, unlike rigid flat panel display devices, have been developed. For example, various types of flexible display devices such as foldable display devices, rollable display devices, bendable display devices, curved display devices, and stretchable display devices are being developed.

SUMMARY

Embodiments of the disclosure provide a display device which can maintain the elasticity of folding areas formed in various flexible display devices such as foldable, rollable, and bendable display devices.

Embodiments of the disclosure also provide a display device which can improve the elasticity of each folding area by using a deposition method to provide deposition structure for an organic layer and an inorganic layer formed in a display panel based on the folding structure and folding area of the display panel.

According to an embodiment of the disclosure, a display device includes a display panel including a folding area, and a display driving circuit which drives image display pixels of the display panel, where the display panel includes a display layer, in which the image display pixels are disposed, an elasticity control layer disposed on the display layer and having an area corresponding to the area of the folding area, and a touch sensing unit disposed on the elasticity control layer, where the touch sensing unit detects a user's touch.

In an embodiment, the folding area may be disposed between a plurality of non-folding areas and in-folded or out-folded in a first or second direction.

In an embodiment, the thickness and elasticity of the elasticity control layer in a third direction, which is a thickness direction of the folding area, are changed based on a folded shape, a flex angle, or a flat shape of the folding area.

According to another embodiment of the disclosure, a display device includes a display panel including a folding area, and a display driving circuit which drives image display pixels of the display panel, where the folding area is disposed between a plurality of non-folding areas and in-folded or out-folded in a first or second direction, and the display panel includes a display layer, in which the image display pixels are disposed, an elasticity control layer disposed on the display layer and having an area corresponding to the area of the folding area, and a touch sensing unit disposed on the display layer with the elasticity control layer therebetween, where the touch sensing unit detects a user's touch.

In a display device according to embodiments of the disclosure, the elasticity of each folding area is maintained and improved based on the folding structure and folding area of a display panel. Therefore, the robustness of the folding areas can be secured, and wrinkles can be reduced.

In addition, in a display device according to embodiments of the disclosure, the thicknesses of an organic layer and an inorganic layer in each folding area are adjusted differently in each folding area. Therefore, the elasticity and durability of each folding area can be improved, and user reliability and satisfaction can be increased.

However, the effects of embodiments of the disclosure are not restricted to the one set forth herein. The above and other effects of the disclosure will become more apparent to one of daily skill in the art to which the disclosure pertains by referencing the claims.

BRIEF DESCRIPTION OF THE DRAWINGS

These and/or other features of embodiments of the invention will become apparent and more readily appreciated by describing in further detail embodiments thereof with reference to the accompanying drawings, in which.

DETAILED DESCRIPTION

Figure 1:
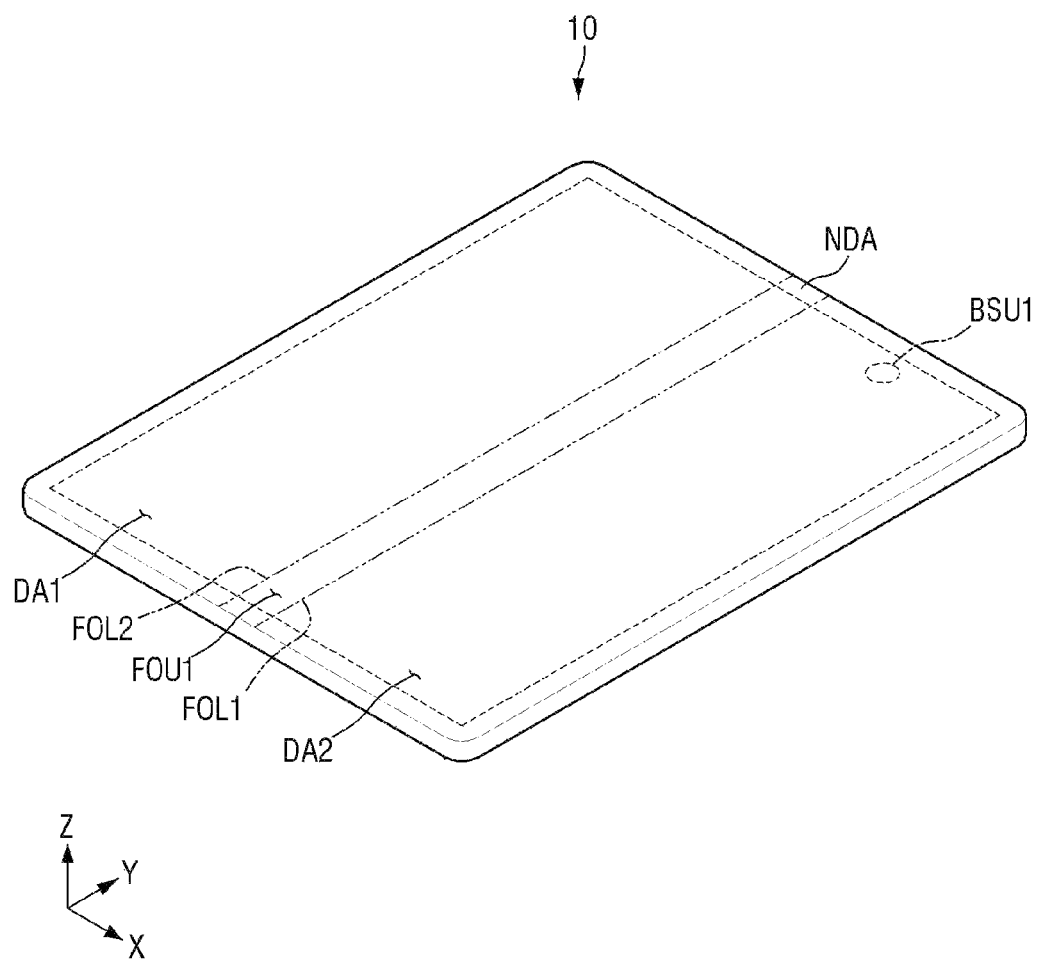
FIG. 1 is a schematic perspective view of a display device according to an embodiment.

The invention will be described more fully hereinafter with reference to the accompanying drawings, in which various embodiments of the disclosure are shown. This invention may, however, be embodied in different forms and should not be construed as limited to the embodiments set forth herein. Rather, these embodiments are provided so that this disclosure will be thorough and complete, and will fully convey the scope of the disclosure to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element.

Each of the features of the various embodiments of the disclosure may be combined or combined with each other, in part or in whole, and technically various interlocking and driving are possible. Each embodiment may be implemented independently of each other or may be implemented together in an association.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2:
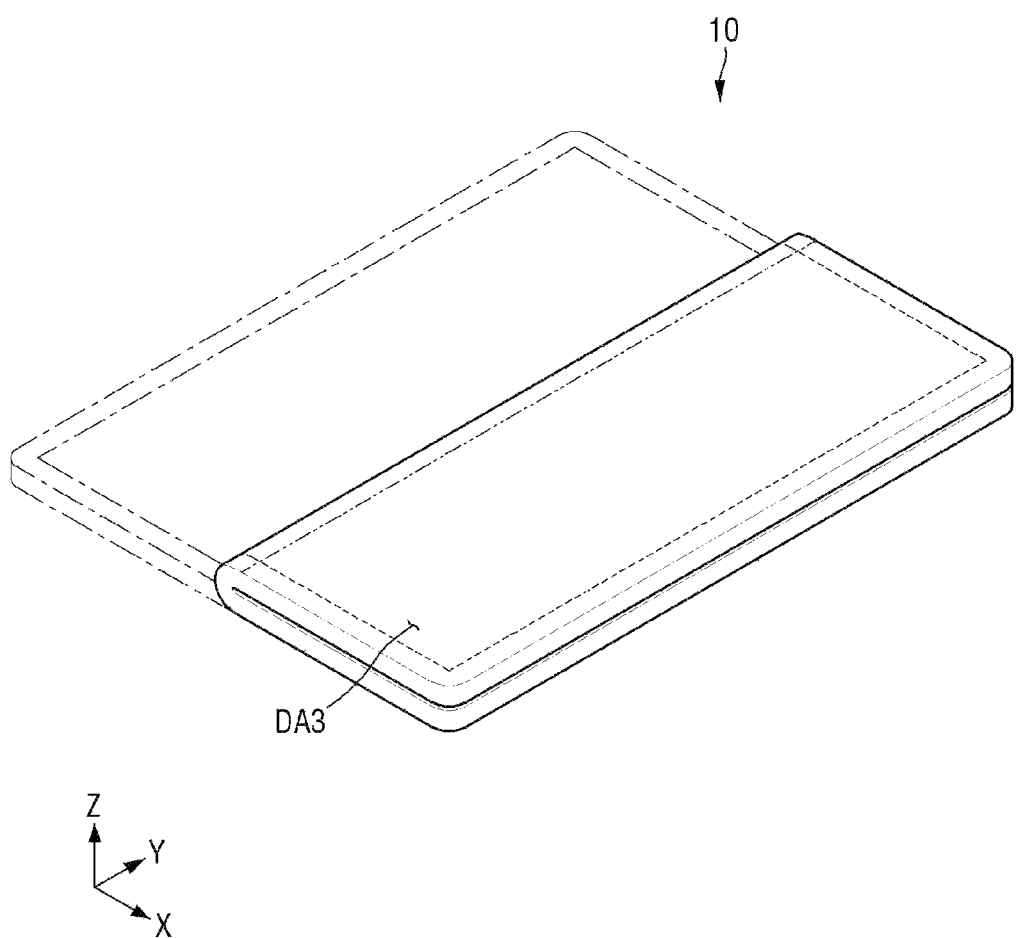
FIG. 2 is a perspective view illustrating a folded shape of the display device according to an embodiment.

FIG. 1 is a schematic perspective view of a display device 10 according to an embodiment. FIG. 2 is a perspective view illustrating a folded shape of the display device 10 according to an embodiment.

Referring to FIGS. 1 and 2, the display device 10 according to an embodiment is of a foldable type and may be applied to portable electronic devices such as mobile phones, smartphones, tablet personal computers (PCs), mobile communication terminals, electronic notebooks, electronic books, portable multimedia players (PMPs), navigation devices, and ultra-mobile PCs (UMPCs). Alternatively, the display device 10 according to an embodiment may be applied as a display unit of a television, a notebook computer, a monitor, a billboard, or an Internet of things (IoT) device.

In the specification, a first direction (X-axis direction) may be a short side direction of the folded display device 10, for example, a horizontal direction of the display device 10. In addition, a second direction (Y-axis direction) may be a long side direction of the folded display device 10, for example, a vertical direction of the display device 10. A third direction (Z-axis direction), which is perpendicular to the first and second directions, may be a thickness direction of the display device 10.

In an embodiment, as shown in FIGS. 1 and 2, the display device 10 may be a foldable display device that can be folded once in the first direction (X-axis direction). The display device 10 can be transformed into or maintained in a once folded state, a flex state bent only at a predetermined angle, or a fully unfolded flat state.

The display device 10 may be folded in an in-folding manner in which a front surface, i.e., an image display surface is disposed inside. When the display device 10 is bent or folded in the in-folding manner, portions of the front surface of the display device 10 may face each other. Alternatively, the display device 10 may be folded in an out-folding manner in which the front surface, i.e., the image display surface is disposed outside. When the display device 10 is bent or folded in the out-folding manner, portions of a back surface of the display device 10 may face each other.

An image display area of the display device 10 may be divided into a plurality of non-folding areas DA1 through DA3 and a first folding area FOU1. In an embodiment, for example, the first folding area FOU1 may be disposed between first and second non-folding areas DA1 and DA2. In such an embodiment, a third non-folding area DA3 may be disposed on a back surface of the first non-folding area DA1. An image non-display area NDA may be defined or formed around the entire image display area, that is, around the non-folding areas DA1 through DA3 and the first folding area FOU1.

The first folding area FOU1 may extend in the second direction (Y-axis direction) between the first and second non-folding areas DA1 and DA2 and may be folded in the in-folding manner or the out-folding manner in the first direction (X-axis direction). In other words, the first non-folding area DA1 may be disposed on a side, e.g., a right side of the first folding area FOU1. In addition, the second non-folding area DA2 may be disposed on the other side, e.g., a left side of the first folding area FOU1. The first folding area FOU1 and first and second folding lines FOL1 and FOL2 may extend in the second direction (Y-axis direction), and the display device 10 may be folded in the first direction (X-axis direction).

When the first folding area FOU1 is folded in the out-folding manner, back surfaces of the first and second non-folding areas DA1 and DA2 may face each other. When the first folding area FOU1 is folded in the in-folding manner, front surfaces of the first and second non-folding areas DA1 and DA2 may face each other. In this way, when the first folding area FOU1 extends in the second direction (Y-axis direction) and is in-folded or out-folded in the first direction (X-axis direction), the area of the display device 10 in the first direction (X-axis direction) may be reduced to about half (½).

When the first folding area FOU1 and the first and second folding lines FOL1 and FOL2 are arranged in the first direction (X-axis direction) to extend in the second direction (Y-axis direction), the area or width of the first folding area FOUL in the first direction (X-axis direction) is shorter or narrower than the length of the first folding area FOU1 in the second direction (Y-axis direction). In addition, the area of the first non-folding area DA1 in the first direction (X-axis direction) may be wider than the area of the first folding area FOU1 in the first direction (X-axis direction). The area of the second non-folding area DA2 in the first direction (X-axis direction) may also be wider than the area of the first folding area FOU1 in the first direction (X-axis direction).

The front image display area of the display device 10 may overlap the first non-folding area DA1, the first folding area FOU1, and the second non-folding area DA2. Therefore, in a state where the display device 10 is unfolded as illustrated in FIG. 1, an image may be displayed on the front side in the first non-folding area DA1, the first folding area FOU1, and the second non-folding area DA2 of the display device 10. In a state where the first folding area FOU1 is in-folded as illustrated in FIG. 2, only the third non-folding area DA3 may be disposed on the front side. In this state, an image may be displayed on the front only in the third non-folding area DA3.

The first folding area FOU1 may include an elasticity control layer that can control elasticity and thickness changes in the third direction (Z-axis direction) which is the thickness direction of the first folding area FOU1. The elasticity control layer of the first folding area FOU1 may be formed to have an area corresponding to the area of the first folding area FOU1 and may be included in the first folding area FOU1. The thickness and elasticity of the elasticity control layer may be changed based on the folded shape, flex angle, or flat shape of the first folding area FOU1, thereby causing the elasticity and thickness of the first folding area FOU1 to be partially changed. The detailed structure of the elasticity control layer and the elasticity changing technology will be described below in greater detail with reference to the accompanying drawings.

Figure 3:
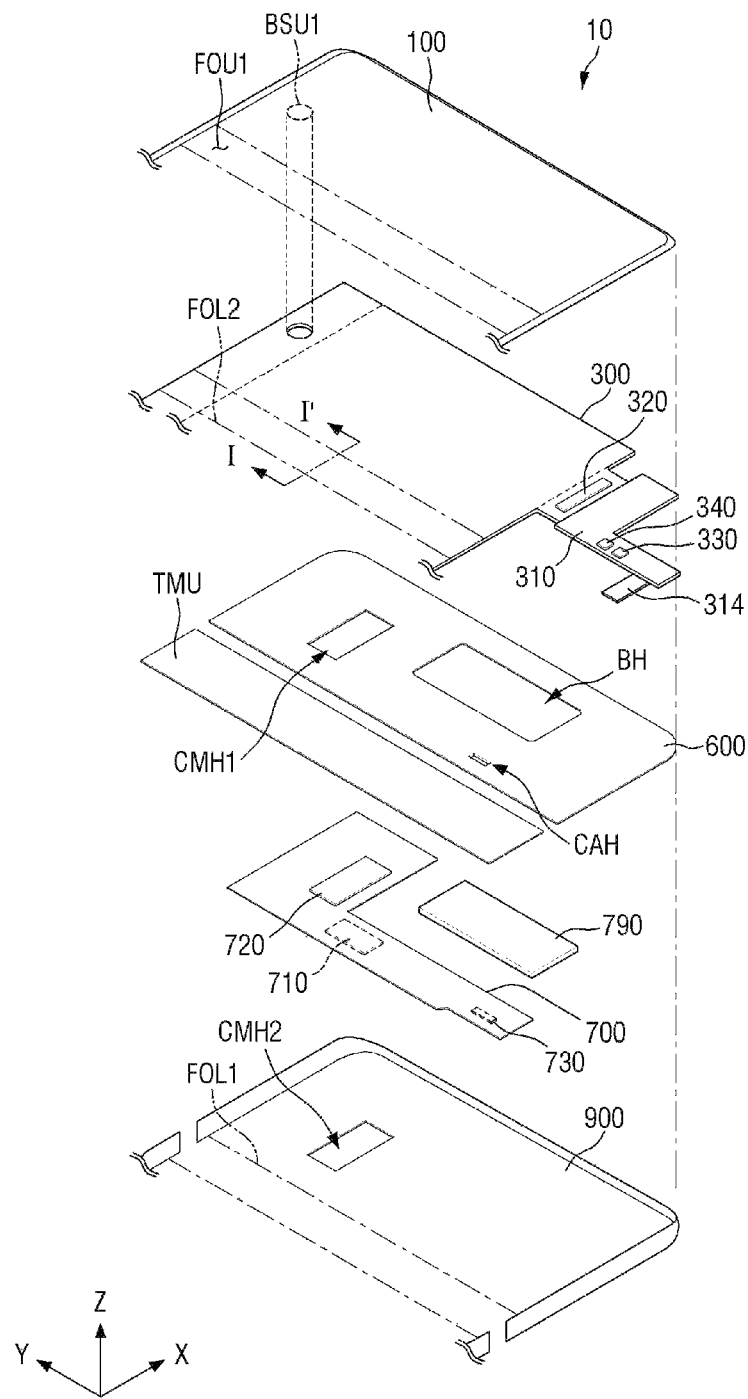
FIG. 3 is an exploded perspective view illustrating some structures corresponding to a first folding area and a second non-folding area in the entire image display area of the display device.

FIG. 3 is an exploded perspective view illustrating some structures corresponding to the first folding area FOU1 and the second non-folding area DA2 in the entire image display area of the display device 10.

FIG. 3 illustrates only the structure of the display device 10 in some areas corresponding to the first folding area FOU1 and the second non-folding area DA2. However, the first and second non-folding areas DA1 and DA2 and the first folding area FOUL are not limited to the structures of FIG. 3 and may also be configured to further include or share different structures.

Referring to some structures of the first folding area FOU1 and the second non-folding area DA2, an embodiment of the display device 10 includes a cover window 100, a display panel 300, a display circuit board 310, a display driving circuit 320, a folding support unit TMU, a bracket 600, a main circuit board 700, and a bottom cover 900.

The display panel 300 may be disposed under or on a back surface of the cover window 100. Pixels that display an image may be formed in an image display area of the display panel 300, and an image non-display area where no pixels are formed may be formed or defined around the image display area. The image non-display area may surround the image display area, and the image display area may occupy most of the area of the display panel 300.

The display panel 300 may be a light emitting display panel including a light emitting element. In an embodiment, for example, the display panel 300 may be an organic light emitting display panel using an organic light emitting diode including an organic light emitting layer, a micro-light emitting diode display panel using a micro-light emitting diode, a quantum dot light emitting display panel using a quantum dot light emitting diode including a quantum dot light emitting layer, or an inorganic light emitting display panel using an inorganic light emitting element including an inorganic semiconductor. Hereinafter, for convenience of description, embodiments where the display panel 300 is an organic light emitting display panel will be mainly described.

The display panel 300 overlapping the first folding area FOU1, that is, the first folding area FOU1 of the display panel 300, includes an elasticity control layer that can control elasticity and thickness changes in the third direction (Z-axis direction) which is the thickness direction of the first folding area FOU1.

In an embodiment, the elasticity control layer included in the first folding area FOU1 of the display panel 300 is formed or provided to have an area corresponding to the area of the first folding area FOU1 and is formed or disposed in the display panel 300 corresponding to the first folding area FOU1. The thickness and elasticity of the elasticity control layer are changed based on the folded shape, flex angle, or flat shape of the first folding area FOU1, thereby causing the elasticity and thickness of the first folding area FOU1 to be partially changed.

The elasticity control layer may be disposed on a display layer in which pixels that display an image are disposed. In addition, a touch electrode layer having touch electrodes for detecting a human body part such as a finger and an electronic pen may be disposed on a front surface of the display layer having the elasticity control layer. The display layer, the elasticity control layer, and the touch electrode layer of the display panel 300 will be described in detail later with reference to the accompanying drawings.

The display panel 300 may include at least one sensor area BSU1. In an embodiment, for example, the sensor area BSU1 may be surrounded by the image display area. Alternatively, the sensor area BSU1 may be surrounded by the image non-display area or may be disposed between the image display area and the image non-display area. In an embodiment, at least one sensor area BSU1 is disposed at an upper center of the display panel 300 as shown in FIGS. 1 and 3, but the position of the sensor area BSU1 is not limited thereto. The sensor area BSU1 may include a light receiving sensor that detects light incident on a front surface, an external temperature sensor that detects the temperature outside the sensor area BSU1, and an internal temperature sensor that detects the temperature inside the sensor area BSU1 (or the temperature of the display panel 300).

The display circuit board 310 and the display driving circuit 320 may be attached to one side of the display panel 300. The display circuit board 310 may be a flexible printed circuit board that can be bent, a rigid printed circuit board that is hard and not easily bent, or a composite printed circuit board including both a rigid printed circuit board and a flexible printed circuit board.

The display driving circuit 320 may receive control signals and power supply voltages through the display circuit board 310 and generate and output signals and voltages for driving the display panel 300. The display driving circuit 320 may be formed as an integrated circuit and attached onto the display panel 300 using a chip on glass (COG) method, a chip on plastic (COP) method, or an ultrasonic method. However, the disclosure is not limited thereto. in an embodiment, for example, the display driving circuit 320 may also be attached onto the display circuit board 310.

A touch driving circuit 330 and a power switching circuit 340 may be disposed on the display circuit board 310. In an embodiment, each of the touch driving circuit 330 and the power switching circuit 340 may be formed as an integrated circuit and attached onto an upper surface of the display circuit board 310. Alternatively, the touch driving circuit 330, the power switching circuit 340, and the display driving circuit 320 may be integrated into one integrated circuit.

The touch driving circuit 330 may be electrically connected to the touch electrodes of the touch electrode layer of the display panel 300 through the display circuit board 310. The touch driving circuit 330 may output touch driving signals to the touch electrodes and detect voltages charged in capacitances of the touch electrodes.

The touch driving circuit 330 may generate touch data according to a change in an electrical signal detected in each of the touch electrodes and transmit the generated touch data to a main processor 710. Then, the main processor 710 may calculate touch coordinates, at which a touch has occurred, by analyzing the touch data. The touch may include a contact touch and a proximity touch. The contact touch refers to a case where an object such as a human finger or a pen directly contacts the cover window 100 disposed on the touch electrode layer. The proximity touch refers to a case where an object such as a human finger or a pen is positioned (e.g., hovers) above the cover window 100 in proximity to the cover window 100.

The power switching circuit 340 may be disposed on the display circuit board 310. The power switching circuit 340 distributes and supplies display driving voltages for driving the display driving circuit 320 and touch driving voltages of the touch driving circuit 330. In an embodiment, a hall sensor that detects a folding angle of the first folding area FOU1 may be further included on the display circuit board 310.

In an embodiment, at least one bracket 600 may be disposed on a back surface of the display panel 300 corresponding to each of the first and second non-folding areas DA1 and DA2. The folding support unit TMU disposed on a back surface of the first folding area FOU1 may be disposed between brackets 600 respectively disposed on the back surfaces of the first and second non-folding areas DA1 and DA2. The bracket 600 may include plastic, metal, or both plastic and metal. The bracket 600 may be provided with a first camera hole CMH1 into which a first camera sensor 720 is inserted, a battery hole BH in which a battery is disposed, and a cable hole CAH through which a cable 314 connected to the display circuit board 310 passes. The main circuit board 700 and a battery 790 may be disposed under the bracket 600. The main circuit board 700 may be a printed circuit board or a flexible printed circuit board.

The main circuit board 700 may include the main processor 710, the first camera sensor 720, and a main connector 730. The first camera sensor 720 may be disposed on both an upper surface and a lower surface of the main circuit board 700, the main processor 710 may be disposed on the upper surface of the main circuit board 700, and the main connector 730 may be disposed on the lower surface of the main circuit board 700.

The main processor 710 may control all the functions of the display device 10. In an embodiment, for example, the main processor 710 may output digital video data to the display driving circuit 320 through the display circuit board 310 so that the display panel 300 can display an image. In addition, the main processor 710 may receive touch data from the touch driving circuit 330, determine coordinates of a user's touch, and then execute an application indicated by an icon displayed at the coordinates of the user's touch. In addition, the main processor 710 may convert first image data received from the first camera sensor 720 into digital video data and output the digital video data to the display driving circuit 320 through the display circuit board 310. Thus, an image captured by the first camera sensor 720 can be displayed on the display panel 300. The cable 314 passing through the cable hole CAH of the bracket 600 may be connected to the main connector 730. Therefore, the main circuit board 700 may be electrically connected to the display circuit board 310.

The battery 790 may be disposed not to overlap the main circuit board 700 in the third direction (Z-axis direction). The battery 790 may overlap the battery hole BH of the bracket 600.

The bottom cover 900 may be disposed under the main circuit board 700 and the battery 790. The bottom cover 900 may be fastened and fixed to the bracket 600. The bottom cover 900 may form the bottom exterior of the display device 10. The bottom cover 900 may include plastic, metal, or both plastic and metal.

A second camera hole CMH2 exposing a lower surface of the first camera sensor 720 may be defined or formed in the bottom cover 900. The position of the first camera sensor 720 and the positions of the first and second camera holes CMH1 and CMH2 corresponding to the first camera sensor 720 are not limited to those illustrated in FIG. 3.

Figure 4:
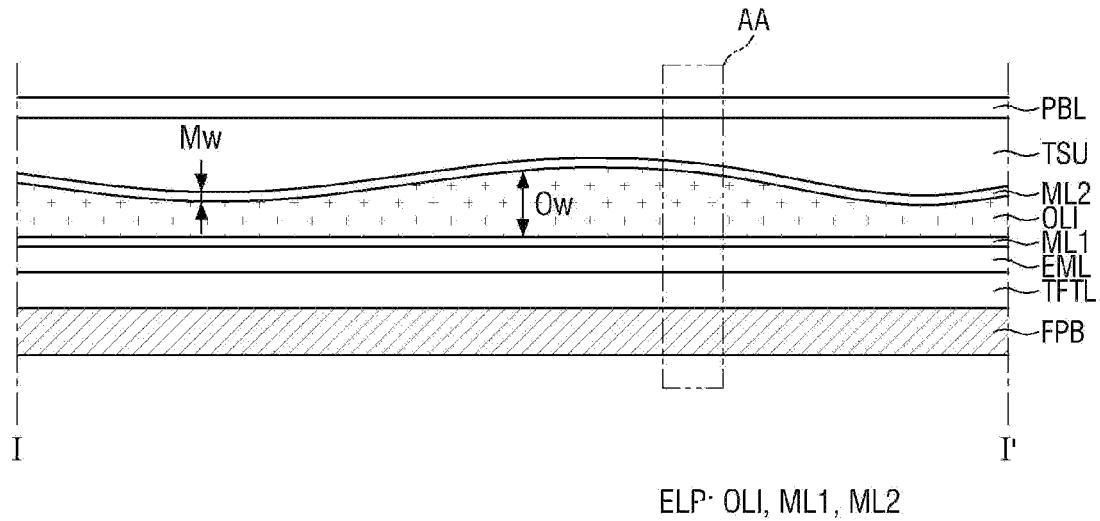
FIG. 4 is a cross-sectional view of the first folding area of a display panel taken along line I-I' of FIG. 3.

FIG. 4 is a cross-sectional view of the first folding area FOU1 of the display panel 300 taken along line I-I' of FIG. 3.

Referring to FIG. 4, the display panel 300 includes a display layer in which image display pixels are disposed, an elasticity control layer ELP disposed in front of the display layer corresponding to the first folding area FOU1, and a touch sensing unit TSU formed in front of the display layer including the elasticity control layer ELP. In addition, the display panel 300 further includes the cover window 100 (shown in FIG. 3) formed to cover a front surface of the touch sensing unit TSU.

The display layer may include a substrate FPB, a thin-film transistor layer TFTL, and a light emitting element layer EML.

The substrate FPB may be a base substrate or a base member. The substrate FPB may be a flexible substrate that can be bent, folded, rolled, etc. In an embodiment, for example, the substrate FPB may include a glass material or a metal material or may include polymer resin such as polyimide.

The thin-film transistor layer TFTL may be disposed on the substrate FPB. The thin-film transistor layer TFTL may include a plurality of thin-film transistors constituting pixel circuits of pixels that display an image. The thin-film transistor layer TFTL may further include gate lines, data lines, power lines, gate control lines, fan-out lines connecting the display driving circuit 320 and the data lines, and lead lines connecting the display driving circuit 320 and a pad unit. In an embodiment where a gate driver is formed in the non-display area NDA which is a peripheral area of the display panel 300, the gate driver may also include thin-film transistors.

The thin-film transistor layer TFTL may be disposed in first and second display areas DA1 and DA2 and at least one folding area (e.g., the first folding area FOU1).

The thin-film transistors of the pixels, the gate lines, the data lines, and the power lines of the thin-film transistor layer TFTL may be disposed in the first and second display areas DA1 and DA2 and the first folding area FOU1. The gate control lines and the fan-out lines of the thin-film transistor layer TFTL may be disposed in the non-display area NDA.

The light emitting element layer EML may be disposed on the thin-film transistor layer TFTL. The light emitting element layer EML may include a plurality of light emitting elements, each including a first electrode, a light emitting layer and a second electrode sequentially stacked to emit light, and a pixel defining layer defining pixels. The light emitting elements of the light emitting element layer EML may be disposed in the first and second display areas DA1 and DA2 and the first folding area FOU1. The light emitting layer may be an organic light emitting layer including an organic material. The light emitting layer may include a hole transporting layer, an organic light emitting layer, and an electron transporting layer. When the first electrode receives a predetermined voltage through a thin-film transistor of the thin-film transistor layer TFTL and the second electrode receives a cathode voltage, holes and electrons may be moved to the organic light emitting layer through the hole transporting layer and the electron transporting layer, respectively. The holes and the electrons may be combined with each other in the organic light emitting layer to emit light. In an embodiment, for example, the first electrode may be an anode, and the second electrode may be a cathode, but the disclosure is not limited thereto.

In another embodiment, for example, the light emitting elements may include quantum dot light emitting diodes including a quantum dot light emitting layer or inorganic light emitting diodes including an inorganic semiconductor.

An encapsulation layer may be further disposed or formed on upper and side surfaces of the light emitting element layer EML to protect and encapsulate the light emitting element layer EML. The encapsulation layer may include at least one inorganic layer and at least one organic layer to encapsulate the light emitting element layer EML.

The elasticity control layer ELP is disposed on or formed in front of the display layer corresponding to at least one folding area of the display panel 300, for example, the first folding area FOU1. In an embodiment, the elasticity control layer ELP is formed on a front surface of the display layer to have an area corresponding to the area of the first folding area FOUL of the display layer.

The thickness and elasticity of the elasticity control layer ELP are changed based on the folded shape, flex angle, or flat shape of the first folding area FOU1, so that a thickness of the first folding area FOU1 maintained in or transformed into a flat shape can be kept constant. In an embodiment, the elasticity control layer ELP includes a first cover material layer ML1, an elasticity control material layer OLI, and a second cover material layer ML2 sequentially stacked in front of the display layer to have an area corresponding to the area of at least one folding area.

The first cover material layer ML1 is disposed on or formed in front of the display layer to have an area corresponding to the area of at least one folding area, for example, the first folding area FOU1.

The first cover material layer ML1 may include or be made of at least one inorganic material layer selected from, for example, a silicon nitride layer, a silicon oxynitride layer, a silicon oxide layer, a titanium oxide layer, and an aluminum oxide layer. The first cover material layer ML1 is formed on the display layer of the first folding area FOU1. In an embodiment, a thickness of the first cover material layer ML1 may be substantially constant throughout the first folding area FOU1. Alternatively, the thickness of the first cover material layer ML1 may be different in each preset region of the first folding area FOU1.

The elasticity control material layer OLI is disposed on or formed in front of the first cover material layer ML1 to cover the entire first cover material layer ML1.

The elasticity control material layer OLI may be an organic material layer including at least one organic material selected from, for example, acryl resin, epoxy resin, phenolic resin, polyamide resin, and polyimide resin. The elasticity control material layer OLI is formed on a front surface of the first cover material layer ML1, and a thickness of the elasticity control material layer OLI is different in each preset region of the first folding area FOU1. In an embodiment, for example, the elasticity control material layer OLI may be thickest in a central region of the first folding area FOU1 and may be thinner in regions around the central region than in the central region.

The second cover material layer ML2 is disposed on or formed in front of the elasticity control material layer OLI to have an area corresponding to the area of at least one folding area, for example, the first folding area FOU1 and to cover the entire elasticity control material layer OLI. Accordingly, the elasticity control material layer OLI may be disposed in a layer between the first and second cover material layers ML1 and ML2, and the thickness and elasticity of the elasticity control material layer OLI between the first and second cover material layers ML1 and ML2 may be changed based on the folded shape, flex angle, or flat shape of the first folding area FOU1.

The second cover material layer ML2 may include or be made of at least one inorganic material layer selected from, for example, a silicon nitride layer, a silicon oxynitride layer, a silicon oxide layer, a titanium oxide layer, and an aluminum oxide layer. The second cover material layer ML2 is formed on the elasticity control material layer OLI. A thickness of the second cover material layer ML2 may be substantially constant throughout the first folding area FOU1. Alternatively, the thickness of the second cover material layer ML2 may be different in each preset region of the first folding area FOU1.

The touch sensing unit TSU may be disposed on the elasticity control layer ELP. The touch sensing unit TSU may include a touch electrode layer in which a plurality of touch electrodes for detecting a user's touch in a capacitive manner are formed, touch lines which connect the touch electrodes and the touch driving circuit 330, and a touch electrode insulating layer which covers the touch electrode layer to insulate the touch electrode layer.

The touch electrodes of the touch sensing unit TSU may be disposed in a touch sensor area that overlaps the display area DA. The touch lines of the touch sensing unit TSU may be disposed in a touch peripheral area that overlaps the non-display area NDA. In an embodiment, for example, the touch sensing unit TSU may sense a user's touch using a self-capacitance method or a mutual capacitance method by using the touch electrodes.

In another embodiment, for example, the touch sensing unit TSU may be disposed on a separate substrate disposed on the elasticity control layer ELP. In such an embodiment, the substrate that supports the touch sensing unit TSU may be a base member that encapsulates the elasticity control layer ELP.

Figure 5:
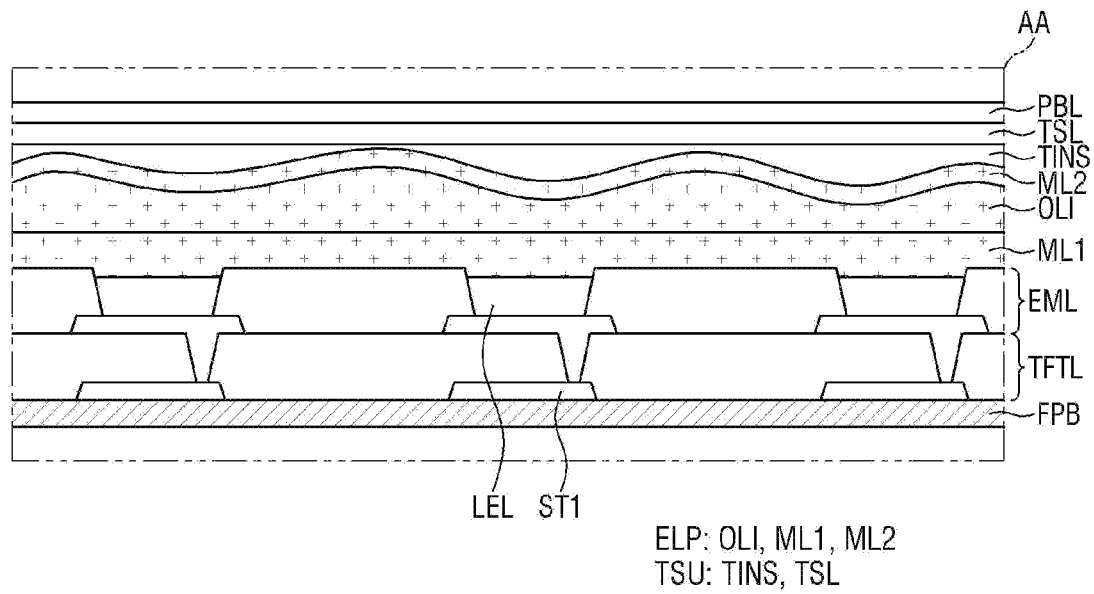
FIG. 5 is a detailed cross-sectional view of area AA of FIG. 4.

FIG. 5 is a detailed cross-sectional view of area AA of FIG. 4.

Referring to FIG. 5, in an embodiment, a barrier layer (not shown) may be provided on the substrate FPB. In such an embodiment the barrier layer may include or be formed of an inorganic material such as silicon nitride, silicon oxynitride or silicon oxide on the flexible substrate FPB that can be bent, folded, rolled, etc. Accordingly, permeation of moisture through the substrate FPB can be prevented.

The thin-film transistor layer TFTL including thin-film transistors ST1 is formed on the substrate FPB having the barrier layer. Each of the thin-film transistors ST1 includes an active layer, a gate electrode, a source electrode, and a drain electrode. The active layer of each of the thin-film transistors ST1 includes polycrystalline silicon, monocrystalline silicon, low-temperature polycrystalline silicon, amorphous silicon, or an oxide semiconductor. The active layer overlapping the gate electrode in the thickness direction of the substrate FPB may be defined as a channel region. The source electrode and the drain electrode may be regions not overlapping the gate electrode and may include or be made conductive by doping a silicon semiconductor or an oxide semiconductor with ions or impurities.

Each of the thin-film transistors ST1 is connected to an anode connection electrode that extends through at least one interlayer insulating layer in the thin-film transistor layer TFTL. A first anode connection electrode may be connected to the drain electrode of each of the thin-film transistors ST1 through a contact hole defined the interlayer insulating layer.

In an embodiment, a planarization layer (not shown) may be formed on the anode connection electrode, and light emitting elements LEL and a pixel defining layer may be disposed on the planarization layer. Each of the light emitting elements LEL includes a pixel electrode, a light emitting layer, and a common electrode. The pixel electrode may be connected to the anode connection electrode through a contact hole defined through the planarization layer. In a top emission structure in which light is emitted from the light emitting layer toward the common electrode, the pixel electrode may include or be made of a metal material having high reflectivity, such as a stacked structure (Ti/Al/Ti) of aluminum and titanium, a stacked structure (ITO/Al/ITO) of aluminum and indium tin oxide, or a stacked structure (ITO/APC/ITO) of an APC alloy and indium tin oxide.

The common electrode may be disposed on the light emitting element layer EML including the light emitting elements LEL. The common electrode may cover the light emitting element layer EML including the light emitting elements LEL. A capping layer (not shown) may be formed on the common electrode.

The elasticity control layer ELP is formed on the display layer, in which the thin-film transistor layer TFTL and the light emitting element layer EML are formed, in an area corresponding to the first folding area FOU1.

In an embodiment, the first cover material layer ML1 is formed on a front surface of the light emitting element layer EML in which the pixel defining layer and the light emitting elements LEL are arranged though at least one deposition process selected from an inkjet printing process, a photolithography process, a sputtering process, and a spin coating process.

The first cover material layer ML1 may include or be made of at least one inorganic material layer selected from a silicon nitride layer, a silicon oxynitride layer, a silicon oxide layer, a titanium oxide layer, and an aluminum oxide layer.

The first cover material layer ML1 is formed on the light emitting element layer EML corresponding to the first folding area FOU1. In an embodiment, the thickness of the first cover material layer ML1 may be substantially constant throughout the first folding area FOU1. Alternatively, the thickness of the first cover material layer ML1 may be formed to be different in each preset region of the first folding area FOU1 by performing an additional deposition process at least once on each preset region of the first folding area FOU1.

The elasticity control material layer OLI is formed on the front surface of the first cover material layer ML1 corresponding to the first folding area FOU1 through at least one deposition process selected from an inkjet printing process, a photolithography process, a sputtering process, and a spin coating process.

The elasticity control material layer OLI may be an organic material layer including at least one organic material selected from acryl resin, epoxy resin, phenolic resin, polyamide resin, and polyimide resin. The thickness of the elasticity control material layer OLI is formed to be different in each preset region of the first folding area FOU1 by performing an additional deposition process at least once on each preset region of the first folding area FOU1. In an embodiment, for example, the elasticity control material layer OLI may be thickest in the central region of the first folding area FOU1 and may be thinner in the regions around the central region than in the central region.

The second cover material layer ML2 is formed on a front surface of the elasticity control material layer OLI through at least one deposition process selected from an inkjet printing process, a photolithography process, a sputtering process, and a spin coating process.

The second cover material layer ML2 may include or be made of at least one inorganic material layer selected from, for example, a silicon nitride layer, a silicon oxynitride layer, a silicon oxide layer, a titanium oxide layer, and an aluminum oxide layer. The second cover material layer ML2 is formed on the elasticity control material layer OLI corresponding to the first folding area FOU1. The thickness of the second cover material layer ML2 may be substantially constant throughout the first folding area FOU1. Alternatively, the thickness of the second cover material layer ML2 may be formed to be different in each preset region of the first folding area FOU1 by performing an additional deposition process at least once on each preset region of the first folding area FOU1.

A touch electrode layer TINS and a touch electrode insulating layer TSL covering the touch electrode layer TINS to insulate the touch electrode layer TINS are sequentially formed on the elasticity control layer ELP. A plurality of touch electrodes for detecting a user's touch in a capacitive manner are formed in the touch electrode layer TINS. The touch electrode insulating layer TSL is formed to cover the touch electrode layer TINS including the touch electrodes.

A protective layer PBL including an inorganic or organic insulating layer is formed on a front surface of the display panel 300 including the touch electrode insulating layer TSL. In addition, the cover window 100 (shown in FIG. 3) may be placed on the front surface of the display panel 300 including the protective layer PBL.

Figure 6:
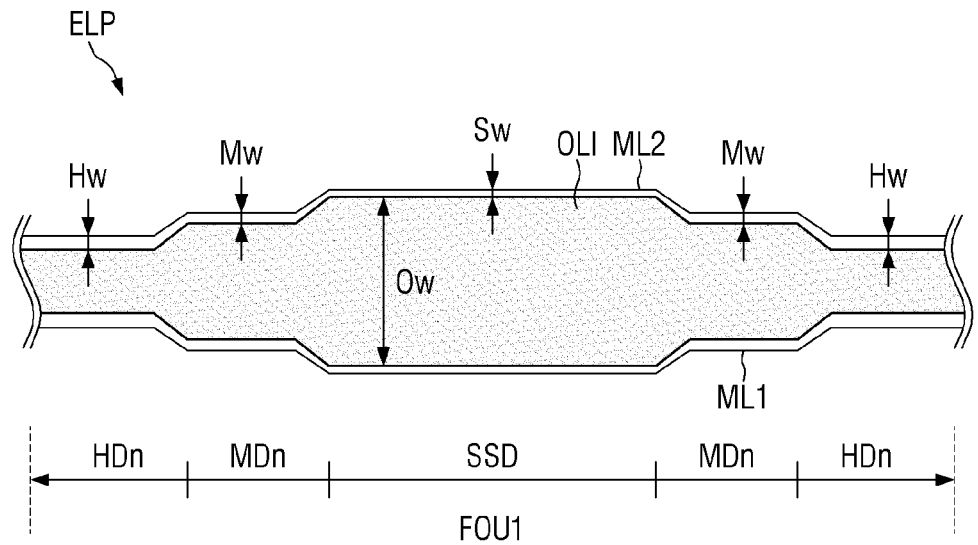
FIG. 6 is a cross-sectional view illustrating a thickness change when an elasticity control layer illustrated in FIGS. 4 and 5 is transformed into a flat state.
Figure 7:
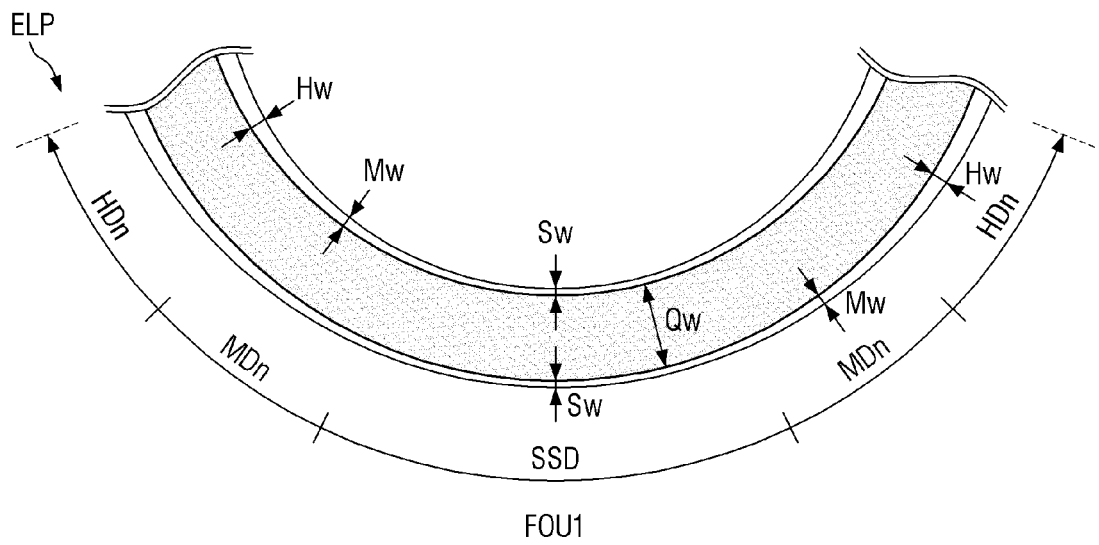
FIG. 7 is a cross-sectional view illustrating a thickness change when the elasticity control layer illustrated in FIG. 6 is transformed into a folded state.

FIG. 6 is a cross-sectional view illustrating a thickness change when the elasticity control layer ELP illustrated in FIGS. 4 and 5 is transformed into a flat state. FIG. 7 is a cross-sectional view illustrating a thickness change when the elasticity control layer ELP illustrated in FIG. 6 is transformed into a folded state.

Referring to FIGS. 6 and 7, in an embodiment, the overall thickness of the elasticity control layer ELP may be different in each preset region of the first folding area FOU1.

In an embodiment, each folding area is divided into a central region SSD preset based on a folded width or area and a plurality of first peripheral regions MDn adjacent to the central region SSD and defined on opposing sides of the central region SSD to have a preset area or width. In addition, a plurality of $n^{th}$ peripheral regions HDn may be further defined on opposing sides of the first peripheral regions MDn to have a preset area or width.

The thickness of the first cover material layer ML1 may be substantially constant throughout the first folding area FOU1. Alternatively, the thickness of the first cover material layer ML1 may be different in the central region SSD, the first peripheral regions MDn, and the $n^{th}$ peripheral regions HDn preset in each folding area.

In an embodiment, for example, the first cover material layer ML1 may be thinner in the central region SSD than in the first peripheral regions MDn and the $n^{th}$ peripheral regions HDn. In such an embodiment, the first cover material layer ML1 may be thicker in the first peripheral regions MDn than in the central region (Sw) and thinner in the first peripheral region MDn than in the $n^{th}$ peripheral regions HDn. In such an embodiment, the first cover material layer ML1 may be thicker in the $n^{th}$ peripheral regions HDn than in the first peripheral regions MDn.

In an embodiment, the thickness of the elasticity control material layer OLI may be different in the central region SSD, the first peripheral regions MDn, and the $n^{th}$ peripheral regions HDn preset in each folding area.

In an embodiment, the elasticity control material layer OLI may be thicker in the central region SSD (Ow) than in the first peripheral regions MDn and the $n^{th}$ peripheral regions HDn. In such an embodiment, the elasticity control material layer OLI may be thinner in the first peripheral regions MDn than in the central region SSD (Ow) and thicker in the first peripheral regions MDn than in the $n^{th}$ peripheral regions HDn. In such an embodiment, the elasticity control material layer OLI may be thinner in the $n^{th}$ peripheral regions HDn than in the first peripheral regions MDn.

The thickness of the second cover material layer ML2 may be substantially constant throughout the first folding area FOU1. Alternatively, the thickness of the second cover material layer ML2 may be different in the central region SSD, the first peripheral regions MDn, and the $n^{th}$ peripheral regions HDn preset in each folding area.

In an embodiment, for example, the second cover material layer ML2 may be thinner in the central region SSD (Sw) than in the first peripheral regions MDn and the $n^{th}$ peripheral regions HDn. In such an embodiment, the second cover material layer ML2 may be thicker in the first peripheral regions MDn (Mw) than in the central region SSD (Sw) and thinner in the first peripheral regions MDn than in the $n^{th}$ peripheral regions HDn. In such an embodiment, the second cover material layer ML2 may be thicker in the $n^{th}$ peripheral regions HDn (Hw) than in the first peripheral regions MDn (Mw).

Referring to FIGS. 6 and 7, since the overall thickness of the elasticity control layer ELP is different in each preset region of the first folding area FOU1, the thickness and elasticity of the elasticity control layer ELP are changed based on the folded shape, flex angle, or flat shape of the first folding area FOU1. In an embodiment, when the first folding area FOU1 maintains a flat shape as shown in FIG. 6, the thickness of the elasticity control layer ELP is changed to be different in the central region SSD, the first peripheral regions MDn, and the $n^{th}$ peripheral regions HDn preset in each folding area. The central region SSD, the first peripheral regions MDn, and the $n^{th}$ peripheral regions HDn are set to correspond to wrinkle shapes of each folding area. Accordingly, when the first folding area FOU1 maintains a flat shape, the thickness of the elasticity control layer ELP is changed to be different in the central region SSD, the first peripheral regions MDn, and the $n^{th}$ peripheral regions HDn to prevent the formation of wrinkles in the first folding area FOU1.

In such an embodiment, when the first folding area FOU1 is changed to a folded state as shown in FIG. 7, the thickness of the elasticity control layer ELP may be changed to be substantially constant in the central region SSD, the first peripheral regions MDn, and the $n^{th}$ peripheral regions HDn of the first folding area FOU1 due to the folding pressure.

Figure 8:
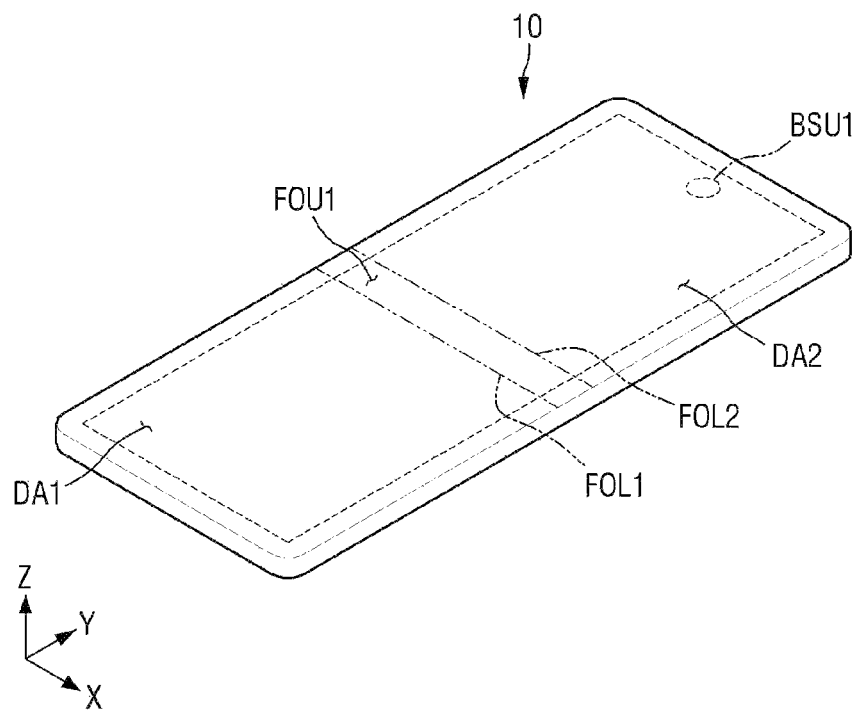
FIG. 8 is a schematic perspective view of a display device according to an embodiment of the disclosure.
Figure 9:
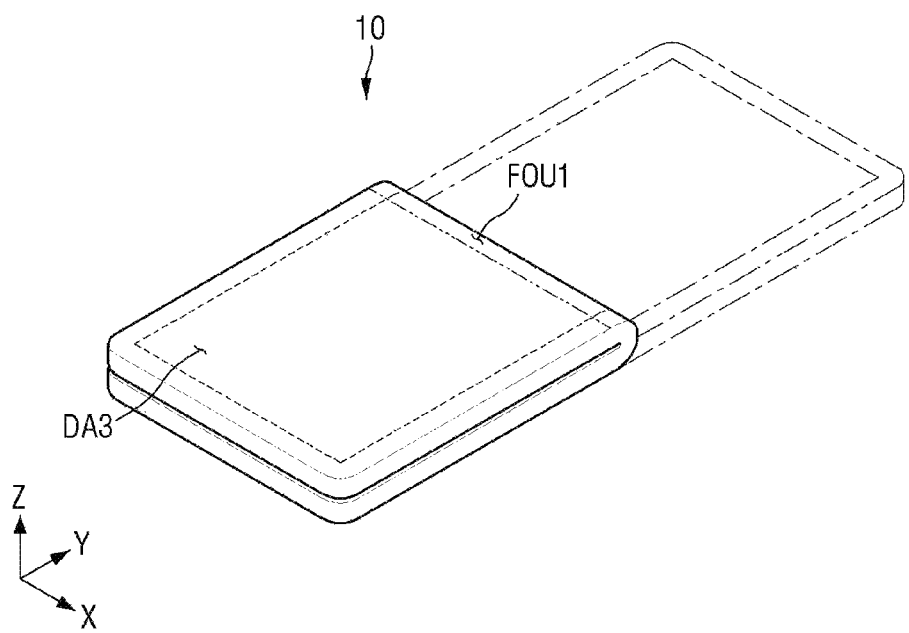
FIG. 9 is a perspective view illustrating a folded shape of the display device illustrated in FIG. 8.

FIG. 8 is a schematic perspective view of a display device 10 according to an embodiment of the disclosure. FIG. 9 is a perspective view illustrating a folded shape of the display device 10 illustrated in FIG. 8.

FIGS. 8 and 9 show an embodiment where the display device 10 is a foldable display device that is folded in the second direction (Y-axis direction). The display device 10 may maintain both a folded state and an unfolded state.

The foldable display device that is folded in the second direction (Y-axis direction) may also include a first folding area FOU1, a first non-folding area DA1, and a second non-folding area DA2. The first folding area FOU1 may be an area where the display device 10 is folded, and the first non-folding area DA1 and the second non-folding area DA2 may be areas where the display device 10 is not folded.

The first folding area FOU1 may be disposed in the second direction (Y-axis direction) and may extend in the first direction (X-axis direction). The first non-folding area DA1 may be disposed on a side, e.g., a lower side of the first folding area FOU1. The second non-folding area DA2 may be disposed on an opposing side, e.g., an upper side of the first folding area FOU1. The first folding area FOU1 may be an area bent with a predetermined curvature at a first folding line FOL1 and a second folding line FOL2. Therefore, the first folding line FOL1 may be a boundary between the first folding area FOUL and the first non-folding area DA1, and the second folding line FOL2 may be a boundary between the first folding area FOU1 and the second non-folding area DA1. In this case, the first folding area FOU1 may be folded in the second direction (Y-axis direction), and the first and second non-folding areas DA1 and DA2 may be folded in the second direction (Y-axis direction) by the folding of the first folding area FOU1. Alternatively, the first folding area FOU1 may extend in a diagonal direction of the display device 10 between the first direction (X-axis direction) and the second direction (Y-axis direction). In this case, the display device 10 may be folded into a triangular shape.

In an embodiment where the first folding area FOU1 extends in the first direction (X-axis direction), a length of the first folding area FOU1 may be shorter in the second direction (Y-axis direction) than in the first direction (X-axis direction). In addition, a length of the first non-folding area DA1 in the second direction (Y-axis direction) may be longer than the length of the first folding area FOU1 in the second direction (Y-axis direction). A length of the second non-folding area DA2 in the second direction (Y-axis direction) may be longer than the length of the first folding area FOU1 in the second direction (Y-axis direction).

An elasticity control layer ELP that can control elasticity and thickness changes in the third direction (Z-axis direction) which is the thickness direction of the first folding area FOU1 may also be included in the first folding area FOUL of the foldable display device that is folded in the second direction (Y-axis direction). The elasticity control layer ELP of the first folding area FOU1 is formed on a display layer of a display panel 300 to have an area corresponding to the area of the first folding area FOU1. The elasticity of the elasticity control layer ELP of the display panel 300 is changed based on the folded shape, flex angle, or flat shape of the first folding area FOU1, thereby causing the elasticity and thickness of the first folding area FOU1 defined in the display panel 300 to be partially changed.

Figure 10:
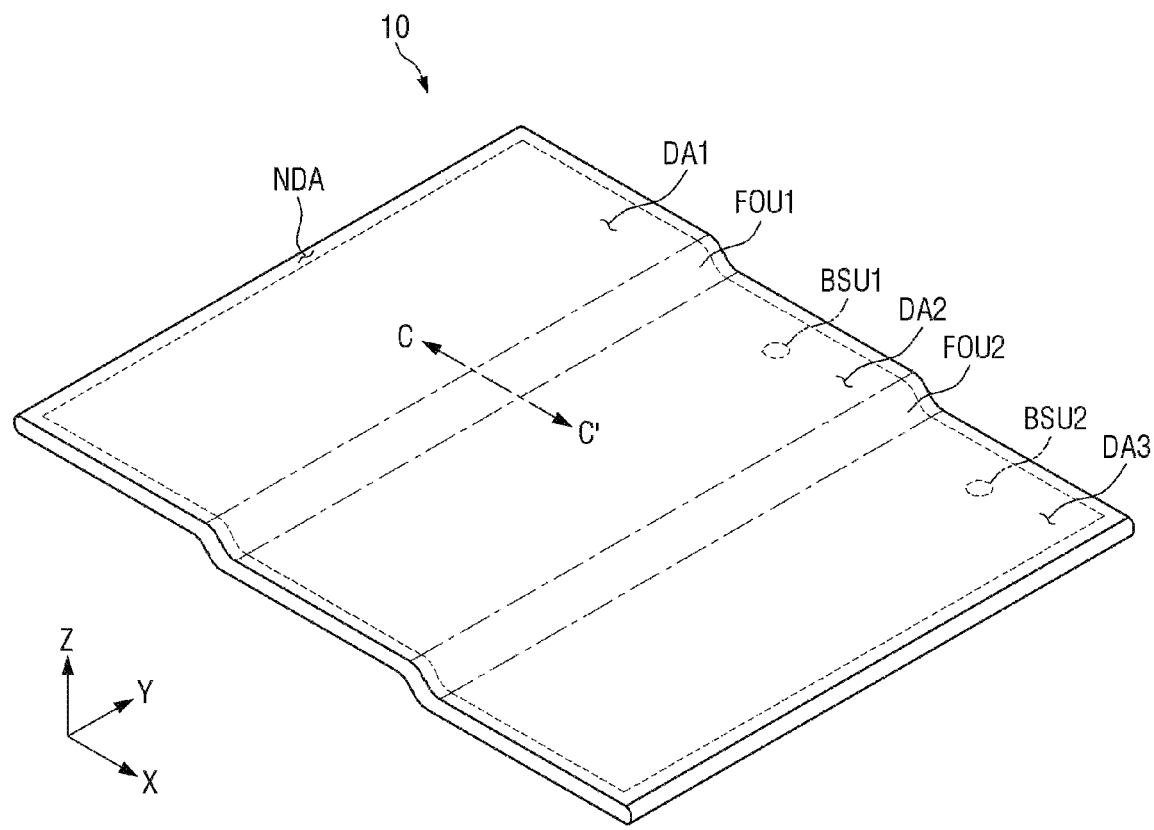
FIG. 10 is a schematic perspective view of a display device according to an embodiment of the disclosure.
Figure 11:
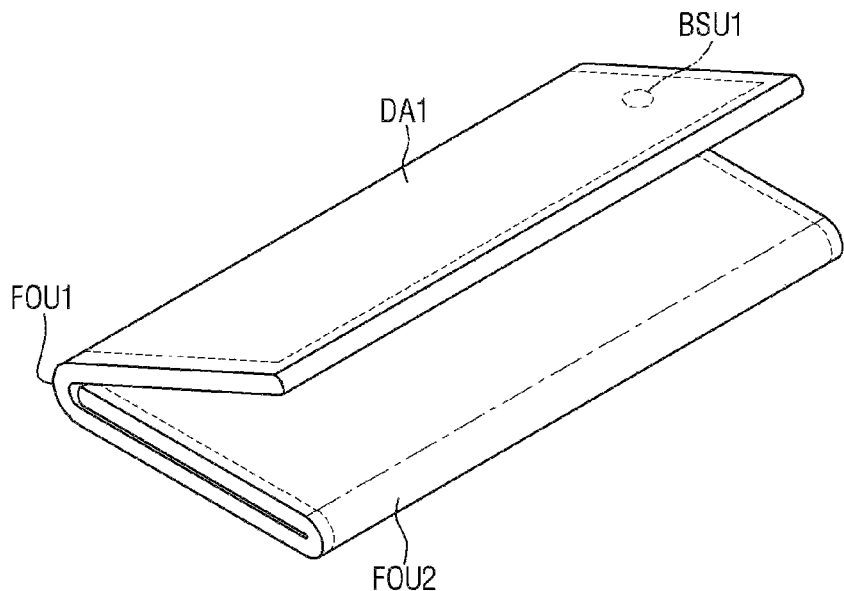
FIG. 11 is a perspective view illustrating a multi-folded shape of the display device illustrated in FIG. 10.

FIG. 10 is a schematic perspective view of a display device 10 according to an embodiment of the disclosure. FIG. 11 is a perspective view illustrating a multi-folded shape of the display device 10 illustrated in FIG. 10.

In an embodiment, as shown in FIGS. 10 and 11, the display device 10 is a multi-foldable display device that can be folded multiple times in the first direction (X-axis direction). The display device 10 may maintain at least once folded state or a fully unfolded state. In an embodiment, the display device 10 may be folded in an in-folding manner in which a front surface, i.e., an image display surface is disposed inside. When the display device 10 is bent or folded in the in-folding manner, portions of the front surface of the display device 10 may face each other. In an embodiment, the display device 10 may be folded in an out-folding manner in which the front surface, i.e., the image display surface is disposed outside. When the display device 10 is bent or folded in the out-folding manner, portions of a back surface of the display device 10 may face each other.

The entire image display area of the display device 10 may be divided into a plurality of non-folding areas DA1 through DA3 and one or more folding areas FOU1 and FOU2. In an embodiment, for example, first and second folding areas FOU1 and FOU2 may be disposed at different positions in the first direction (X-axis direction) and may extend along the second direction (Y-axis direction). Accordingly, first and second non-folding areas DA1 and DA2 may be arranged in the first direction (X-axis direction) with the first folding area FOU1 interposed therebetween, and second and third non-folding areas DA2 and DA3 may be arranged in the first direction (X-axis direction) with the second folding area FOU2 interposed therebetween. In addition, an image non-display area NDA may be formed around the entire image display area, that is, around the non-folding areas DA1 through DA3 and the folding areas FOU1 and FOU2.

The first folding area FOU1 may extend in the second direction (Y-axis direction) between the first and second non-folding areas DA1 and DA2. In addition, the first folding area FOU1 may be folded in the first direction (X-axis direction) in the in-folding or out-folding manner. Therefore, when the first folding area FOU1 is folded in the out-folding manner, back surfaces of the first and second non-folding areas DA1 and DA2 may face each other. When the first folding area FOU1 is folded in the in-folding manner, front surfaces of the first and second non-folding areas DA1 and DA2 may face each other. In this way, when the first folding area FOU1 extends in the second direction (Y-axis direction) and is in-folded or out-folded in the first direction (X-axis direction), the area of the display device 10 in the first direction (X-axis direction) may be reduced to about two-thirds ($\frac{2}{3}$).

The second folding area FOU2 may extend in the second direction (Y-axis direction) between the second and third non-folding areas DA2 and DA3. In addition, the second folding area FOU2 may be folded in the first direction (X-axis direction) in the in-folding or out-folding manner. Therefore, when the second folding area FOU2 is folded in the in-folding manner, front surfaces of the second and third non-folding areas DA2 and DA3 may face each other. When the second folding area FOU2 is folded in the out-folding manner, back surfaces of the second and third non-folding areas DA2 and DA3 may face each other. In this way, when the second folding area FOU2 extends in the second direction (Y-axis direction) and is in-folded or out-folded in the first direction (X-axis direction), the area of the display device 10 in the first direction (X-axis direction) may be reduced to about two-thirds ($\frac{2}{3}$).

In an embodiment, as illustrated in FIG. 11, the display device 10 may have a 'G'-type or reverse 'G'-type foldable structure in which both the first and second folding areas FOU1 and FOU2 are folded in the in-folding manner so that the front surfaces of the second and third non-folding areas DA2 and DA3 face each other and that the front surface of the first non-folding area DA1 faces the back surface of the third non-folding area DA3. When the display device 10 is folded into the 'G'-type or reverse 'G'-type foldable structure, a length of the display device 10 in the first direction (X-axis direction) may be reduced to about one-third (⅓). Therefore, a user can easily fold and carry the display device 10.

In an embodiment, the multi-foldable display device 10 may also have an 'S'-type or reverse 'S'-type foldable structure in which the first folding area FOU1 is folded in the out-folding manner so that the back surfaces of the first and second non-folding areas DA1 and DA2 face each other, and the second non-folding area FOU2 is folded in the in-folding manner so that the front surfaces of the second and third non-folding areas DA2 and DA3 face each other. When both the first and second folding areas FOU1 and FOU2 are in-folded or out-folded in the 'S'-type or reverse 'S'-type foldable structure, the area of the display device 10 in the first direction (X-axis direction) may be reduced to about one-third (⅓). Therefore, a user can easily carry the display device 10.

An elasticity control layer ELP that can control elasticity and thickness changes in the third direction (Z-axis direction) which is the thickness direction of each of the first and second folding areas FOU1 and FOU2 may also be included in each of the first and second folding areas FOU1 and FOU2 of the multi-foldable display device 10. The elasticity control layer ELP included in each of the first and second folding areas FOUL and FOU2 is formed on a display layer of a display panel 300 to have an area corresponding to the area of each of the first and second folding areas FOUL and FOU2. The elasticity of the elasticity control layers ELP of the display panel 300 may be changed based on the folded shape, flex angle, or flat shape of each of the first and second folding areas FOUL and FOU2, thereby causing the elasticity and thickness of the first and second folding areas FOU1 and FOU2 to be partially changed.

Figure 12:
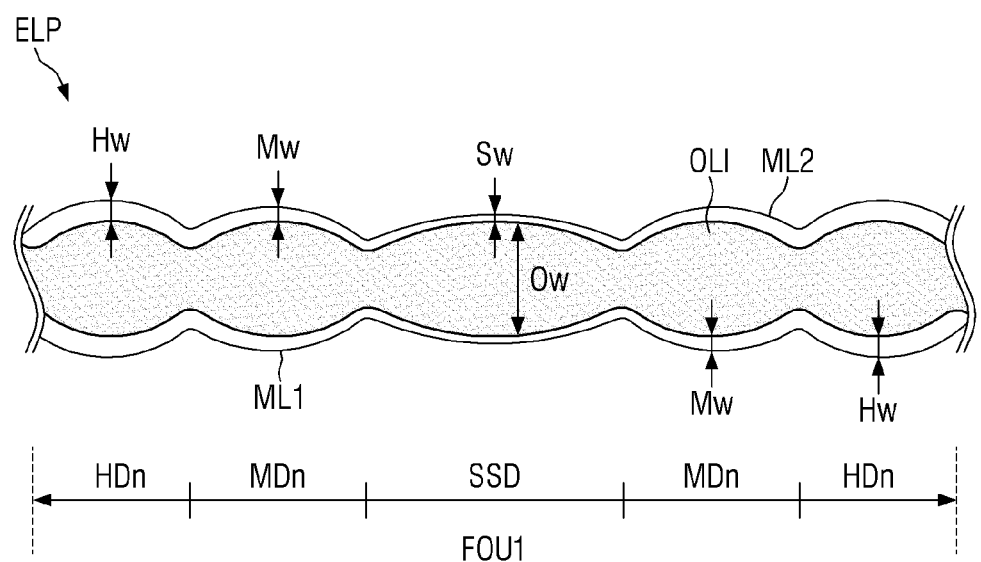
FIG. 12 is a cross-sectional view illustrating a thickness change when an elasticity control layer applicable to the display devices illustrated in FIGS. 8 through 11 is transformed into a flat state.

FIG. 12 is a cross-sectional view illustrating a thickness change when an elasticity control layer ELP applicable to the display devices illustrated in FIGS. 8 through 11 is transformed into a flat state. Specifically, FIG. 12 is a cross-sectional view taken along line C-C' of FIG. 10.

Referring to FIG. 12, in an embodiment, each of the folding areas such as the first folding area FOU1 and the second folding area FOU2 may be divided and defined in advance into a central region SSD, a plurality of first peripheral regions MDn closest to the central region SSD, and a plurality of $n^{th}$ peripheral regions HDn adjacent to the first peripheral regions MDn based on a folded width or area.

A thickness of a first cover material layer ML1 formed in the elasticity control layer ELP according to folding characteristics of each of the first and second folding areas FOU1 and FOU2 may be substantially constant throughout each of the first and second folding areas FOU1 and FOU2. Alternatively, the thickness of the first cover material layer ML1 may be different in the central region SSD, the first peripheral regions MDn, and the $n^{th}$ peripheral regions HDn preset in each folding area.

In an embodiment, for example, the first cover material layer ML1 may be thinner in the central region SSD than in the first peripheral regions MDn and the $n^{th}$ peripheral regions HDn. In such an embodiment, the first cover material layer ML1 may be thicker in the first peripheral regions MDn than in the central region SSD and thinner in the first peripheral regions MDn than in the $n^{th}$ peripheral regions HDn. In such an embodiment, the first cover material layer ML1 may be thicker in the $n^{th}$ peripheral regions HDn than in the first peripheral regions MDn.

A thickness of an elasticity control material layer OLI formed in the elasticity control layer ELP based on the folding characteristics of each of the first and second folding areas FOU1 and FOU2 is different in the central region SSD, the first peripheral regions MDn, and the $n^{th}$ peripheral regions HDn.

In an embodiment, for example, the elasticity control material layer OLI may be thinner in the central region SSD (Ow) than in the first peripheral regions MDn and the $n^{th}$ peripheral regions HDn. In such an embodiment, the elasticity control material layer OLI may be thicker in the first peripheral regions MDn than in the central region SSD (Ow) and thinner in the first peripheral regions MDn than in the $n^{th}$ peripheral regions HDn. In such an embodiment, the elasticity control material layer OLI may be thicker in the $n^{th}$ peripheral regions HDn than in the first peripheral regions MDn.

A thickness of a second cover material layer ML2 formed in the elasticity control layer ELP based on the folding characteristics of each of the first and second folding areas FOU1 and FOU2 may be substantially constant throughout each of the first and second folding areas FOU1 and FOU2. Alternatively, the thickness of the second cover material layer ML2 may be different in the central region SSD, the first peripheral regions MDn, and the $n^{th}$ peripheral regions HDn preset in each folding area.

In an embodiment, for example, the second cover material layer ML2 may be thinner in the central region SSD than in the first peripheral regions MDn and the $n^{th}$ peripheral regions HDn. In such an embodiment, the second cover material layer ML2 may be thicker in the first peripheral regions MDn than in the central region SSD (Sw) and thinner in the first peripheral regions MDn than in the $n^{th}$ peripheral regions HDn. In such an embodiment, the second cover material layer ML2 may be thicker in the $n^{th}$ peripheral regions HDn than in the first peripheral regions MDn.

Figure 13:
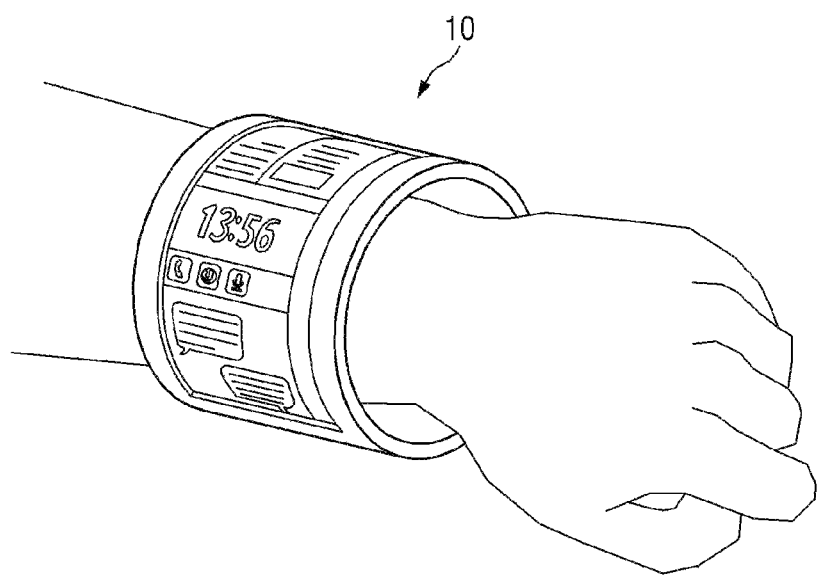
FIG. 13 is a perspective view of a rollable display device according to an embodiment of the disclosure.
Figure 14:
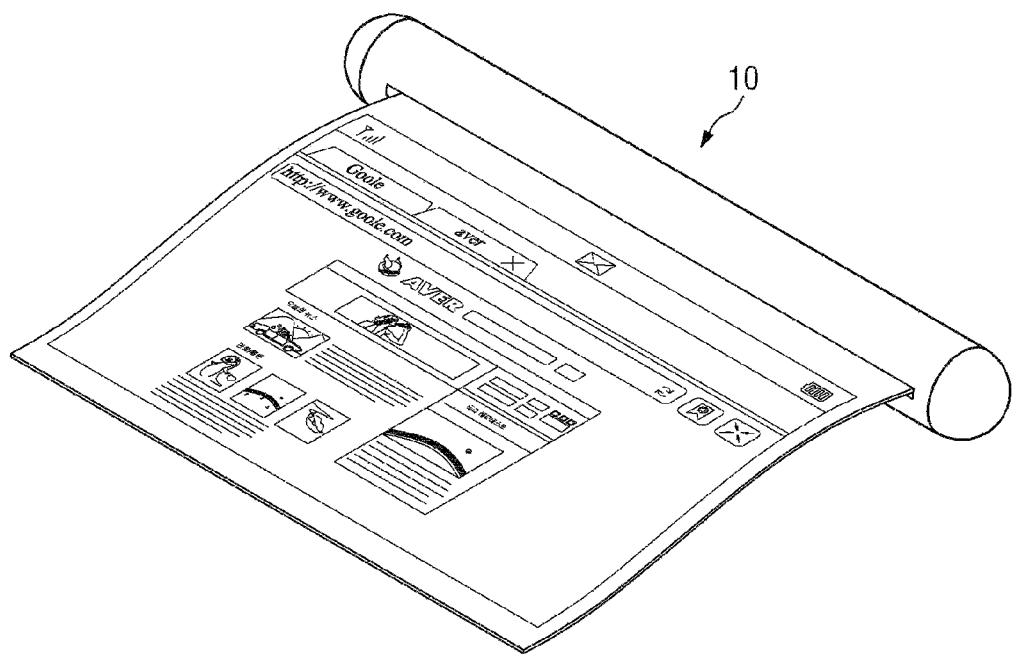
FIG. 14 is a perspective view of a rollable display device according to an embodiment of the disclosure.

FIG. 13 is a perspective view of a rollable display device according to an embodiment of the disclosure. FIG. 14 is a perspective view of a rollable display device according to an embodiment of the disclosure.

Referring to FIGS. 13 and 14, a rollable type display device 10 may be applied as a display unit of a portable electronic device such as a tablet personal computer (PC), a mobile communication terminal, an electronic notebook, an electronic book, or an ultra-mobile PC (UMPC). A display panel 300 of the rollable type display device 10 may be bent and rolled in the first direction (X-axis direction) or the second direction (Y-axis direction).

An elasticity control layer ELP that can control elasticity and thickness changes in the third direction (Z-axis direction) which is the thickness direction of the display panel 300 may be included so that the display panel 300 can have elasticity to prevent the formation of wrinkles while being rolled in the first direction (X-axis direction) or the second direction (Y-axis direction). The elasticity control layer ELP is formed on a display layer of the display panel 300, that is, on a front surface of the display layer to have an area corresponding to the area of the display layer of the display panel 300. The elasticity of the elasticity control layer ELP of the display panel 300 may be changed based on the folded shape, flex angle, and flat shape of the display panel 300, thereby causing the elasticity and thickness of the display panel 300 to be partially changed.

In a display device according to embodiments of the disclosure, the elasticity of each folding area is maintained and improved based on the folding structure and folding area of a display panel. Therefore, the robustness of the folding areas can be secured, and wrinkles can be reduced.

In addition, in a display device according to embodiments of the disclosure, the thicknesses of an organic layer and an inorganic layer in each folding area are adjusted differently in each folding area. Therefore, the elasticity and durability of each folding area can be improved, and user reliability and satisfaction can be increased.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
   a display panel comprising a folding area; and
   a display driving circuit which drives image display pixels of the display panel,
   wherein the display panel comprises:
     a display layer in which the image display pixels are disposed;
     an elasticity control layer disposed on the display layer and having an area corresponding to an area of the folding area, wherein the area of the elasticity control layer corresponding to the area of the folding area has a non-uniform thickness in a flat state, and has a substantially constant thickness in a folded state; and
     a touch sensing unit disposed on the elasticity control layer, wherein the touch sensing unit detects a user's touch.

2. The display device of claim 1, wherein the folding area is disposed between a plurality of non-folding areas and in-folded or out-folded in a first or second direction.

3. The display device of claim 1, wherein a thickness and an elasticity of the elasticity control layer in a third direction, which is a thickness direction of the folding area, are changed based on a folded shape, a flex angle, or a flat shape of the folding area.

4. The display device of claim 3, wherein the elasticity control layer comprises:
   a first cover material layer disposed on the display layer and having an area corresponding to the area of the folding area;
   an elasticity control material layer disposed on the first cover material layer to cover the first cover material layer; and
   a second cover material layer disposed on the elasticity control material layer to cover the elasticity control material layer.

5. The display device of claim 4, wherein
   each of the first and second cover material layers comprises an inorganic material layer selected from a silicon nitride layer, a silicon oxynitride layer, a silicon oxide layer, a titanium oxide layer and an aluminum oxide layer, and
   each of the first and second cover material layers has a constant thickness throughout the folding area or has different thicknesses from each other in preset regions of the folding area, respectively.

6. The display device of claim 4, wherein the elasticity control material layer is an organic material layer comprising an organic material selected from acryl resin, epoxy resin, phenolic resin, polyamide resin and polyimide resin.

7. The display device of claim 4, wherein
   the folding area is divided and defined into a central region preset based on a folded width or area, a plurality of first peripheral regions adjacent to the central region and defined on a side of the central region to have a preset area or width thereof, and a plurality of n-th peripheral regions defined on a side of the first peripheral regions to have a preset area or width thereof, and
   each of the first and second cover material layers has different thicknesses from each other in the central region, the first peripheral regions, and the n-th peripheral regions.

8. The display device of claim 7, wherein each of the first and second cover material layers is thinner in a region corresponding to the central region than in regions corresponding to the first peripheral regions and the n-th peripheral regions and is thicker in the regions corresponding to the first peripheral regions than in the region corresponding to the central region and thinner in the regions corresponding to the first peripheral regions than in the regions corresponding to the n-th peripheral regions.

9. The display device of claim 7, wherein the elasticity control material layer has different thicknesses from each other in the central region, the first peripheral regions, and the n-th peripheral regions.

10. The display device of claim 9, wherein the elasticity control material layer is thicker in a region corresponding to the central region than in regions corresponding to the first peripheral regions and the n-th peripheral regions and is thinner in the regions corresponding to the first peripheral regions than in the region corresponding to the central region and thicker in the regions corresponding to the first peripheral regions than in the regions corresponding to the n-th peripheral regions.

11. The display device of claim 9, wherein the elasticity control material layer is thinner in a region corresponding to the central region than in regions corresponding to the first peripheral regions and the n-th peripheral regions and is thicker in the regions corresponding to the first peripheral regions than in the region corresponding to the central region and thinner in the regions corresponding to the first peripheral regions than in the regions corresponding to the n-th peripheral regions.

12. A display device comprising:
    a display panel comprising a folding area; and
    a display driving circuit which drives image display pixels of the display panel,
    wherein the folding area is disposed between a plurality of non-folding areas and in-folded or out-folded in a first or second direction, and
    wherein the display panel comprises:
      a display layer, in which the image display pixels are disposed;
      an elasticity control layer disposed on the display layer and having an area corresponding to an area of the folding area, wherein the area of the elasticity control layer corresponding to the area of the folding area has a non-uniform thickness in a flat state, and has a substantially constant thickness in a folded state; and
      a touch sensing unit disposed on the display layer with the elasticity control layer therebetween, wherein the touch sensing unit detects a user's touch.

13. The display device of claim 12, wherein a thickness and an elasticity of the elasticity control layer in a third direction, which is a thickness direction of the folding area, are changed based on a folded shape, a flex angle, or a flat shape of the folding area.

14. The display device of claim 13, wherein the folding area is divided and defined into a central region preset based on a folded width or area, a plurality of first peripheral regions closest to the central region and defined on a side of the central region to have a preset area or width thereof, and a plurality of n-th peripheral regions defined on a side of the first peripheral regions to have a preset area or width thereof.

15. The display device of claim 14, wherein the elasticity control layer comprises:
- a first cover material layer disposed on the display layer and having an area corresponding to the area of the folding area;
- an elasticity control material layer disposed the first cover material layer to cover the first cover material layer; and
- a second cover material layer disposed on the elasticity control material layer to cover the elasticity control material layer.

16. An electronic device comprising a display device, wherein the display device comprises:
- a display panel comprising a folding area; and
- a display driving circuit which drives image display pixels of the display panel, wherein the display panel comprises:
- a display layer in which the image display pixels are disposed;
- an elasticity control layer disposed on the display layer and having an area corresponding to an area of the folding area, wherein the area of the elasticity control layer corresponding to the area of the folding area has a non-uniform thickness in a flat state, and has a substantially constant thickness in a folded state; and
- a touch sensing unit disposed on the elasticity control layer, wherein the touch sensing unit detects a user's touch.

* * * * *